United States Patent
Gee

(10) Patent No.: US 12,031,652 B2
(45) Date of Patent: Jul. 9, 2024

(54) PIPE SUPPORT

(71) Applicant: CHS Inc., Inver Grove Heights, MN (US)

(72) Inventor: Michael A. Gee, Billings, MT (US)

(73) Assignee: CHS, Inc., Inver Grove Heights, MN (US)

( * ) Notice: Subject to any disclaimer, the term of this patent is extended or adjusted under 35 U.S.C. 154(b) by 233 days.

(21) Appl. No.: 16/866,273

(22) Filed: May 4, 2020

(65) Prior Publication Data

US 2021/0341083 A1    Nov. 4, 2021

(51) Int. Cl.
*F16L 3/24* (2006.01)
*F16L 58/02* (2006.01)

(52) U.S. Cl.
CPC ............... *F16L 3/24* (2013.01); *F16L 58/02* (2013.01)

(58) Field of Classification Search
CPC ..... F16L 3/24; F16L 58/02; F16L 3/02; F16B 5/0225; F16M 13/02
USPC ............ 248/670, 924, 70, 274.1, 354.1, 201
See application file for complete search history.

(56) References Cited

U.S. PATENT DOCUMENTS

| | | | | | |
|---|---|---|---|---|---|
| 3,355,132 A | * | 11/1967 | Jenkins | ................. | H02G 3/0456 248/327 |
| 3,853,304 A | * | 12/1974 | Jackson | .................. | H02G 1/04 174/41 |
| 3,888,446 A | * | 6/1975 | O'Brien | ................. | F16B 7/0486 403/392 |
| 3,923,277 A | * | 12/1975 | Perrault | .................... | F16L 3/00 211/208 |
| 4,222,577 A | * | 9/1980 | Giffin | ...................... | B28B 1/025 279/151 |
| 4,239,198 A | * | 12/1980 | Trupp | ....................... | B27L 7/08 269/204 |
| 4,974,651 A | * | 12/1990 | Carmon | ................... | B25H 1/04 144/287 |
| 5,163,642 A | * | 11/1992 | Torrens | ................... | F16B 2/065 248/55 |
| 5,320,150 A | * | 6/1994 | Everts | ...................... | B25H 1/04 144/286.5 |
| 5,441,091 A | * | 8/1995 | Collins | ................... | B27B 25/02 144/287 |
| 5,556,085 A | * | 9/1996 | Cyr | ...................... | G02B 25/005 269/258 |
| 5,727,778 A | * | 3/1998 | Nodar | ..................... | B25B 1/205 269/45 |

(Continued)

FOREIGN PATENT DOCUMENTS

| | | | | |
|---|---|---|---|---|
| CH | 705459 A1 | * | 3/2013 | ................ F16L 3/10 |
| DE | 19702691 C1 | * | 11/1997 | ................ F16L 3/22 |

(Continued)

*Primary Examiner* — Kimberly T Wood
(74) *Attorney, Agent, or Firm* — Brooks, Cameron & Huebsch, PLLC

(57) ABSTRACT

Pipe supports are described herein. A pipe support can include a first elongated body having a first top surface for supporting a pipe having a pipe surface, a second elongated body having a second top surface for supporting the pipe and a support structure slidably coupled to the first elongated body and to the second elongated body such that the first top surface or the second top surface is in contact with the pipe surface when the other of the first top surface and the second top surface is not in contact with the pipe surface.

18 Claims, 3 Drawing Sheets

(56) References Cited

U.S. PATENT DOCUMENTS

| | | | | |
|---|---|---|---|---|
| 9,334,997 | B1* | 5/2016 | Tokumasu | F16M 13/027 |
| 2007/0108353 | A1* | 5/2007 | Bikowsky | F16L 3/243 |
| | | | | 248/74.1 |
| 2017/0204993 | A1* | 7/2017 | Eljaouhari | F16L 3/20 |
| 2018/0209580 | A1* | 7/2018 | Wise | F16M 11/22 |
| 2018/0299032 | A1* | 10/2018 | Schoeberl | F16L 3/13 |
| 2021/0278017 | A1* | 9/2021 | Gee | F16L 3/015 |

FOREIGN PATENT DOCUMENTS

| | | | | |
|---|---|---|---|---|
| EP | 1741965 A1 * | 1/2007 | | F16L 3/1016 |
| WO | WO-2021048666 A1 * | 3/2021 | | E04B 9/18 |

* cited by examiner

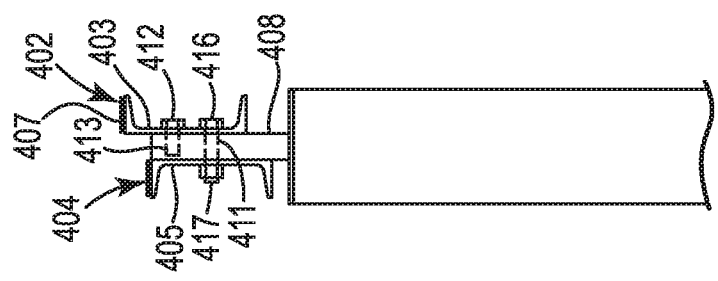
FIG. 2
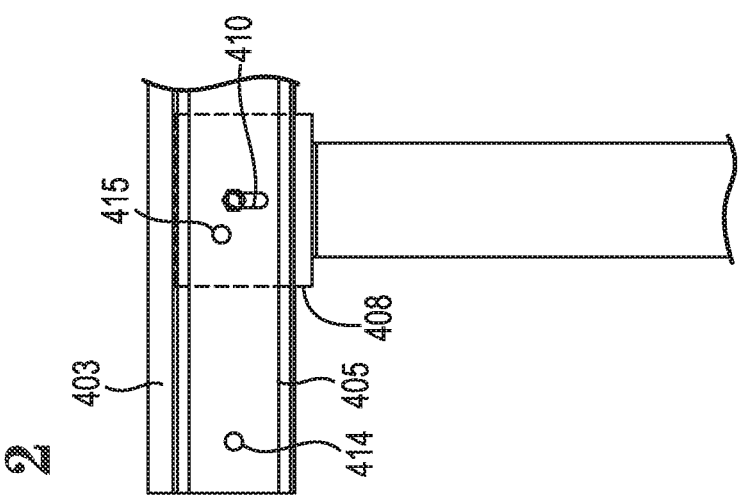
FIG. 3A
FIG. 3B
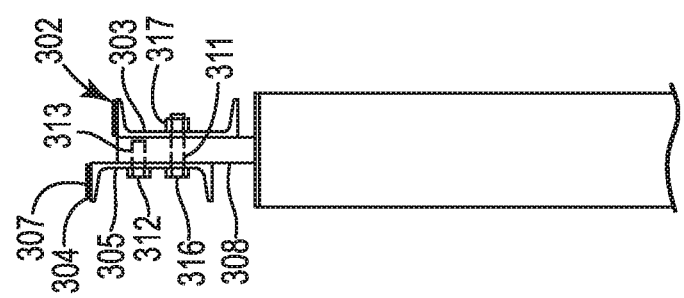
FIG. 4A
FIG. 4B

PIPE SUPPORT

TECHNICAL FIELD

The present disclosure relates to pipe supports that support pipes when in use.

BACKGROUND

Pipes are used in many configurations and fields of technology to convey fluids and gasses from one place to another. For example, in the field of fuel delivery, pipes can convey raw petroleum and petroleum byproducts from one place to another.

They are used in many applications such as at refineries, refined product terminals, pipeline pump stations, natural gas installations, compressor stations, petroleum processing plants, and many other places. In petroleum processing plants, for example, there can be thousands of individual pipes running from place to place within, into, and out of the processing plant.

The pipes themselves can be heavy depending on the material of which they are made. Most often they are made from a metallic material, usually from steel or an alloy thereof. Supports are used to take on the weight of the pipes along with the weight of the material moving through the pipes, which can be heavy.

This currently is accomplished in a couple different ways. One way is to place a strap around the outside surface of the pipe and suspend the strap from above the pipe. Another method is to build a support platform, with a support surface, such that the bottom of the pipe rests on the support surface.

However, the metallic materials the pipes are made of can be susceptible to corrosion, such as rusting of the metallic material. This corrosion typically forms on the bottoms of the pipes as gravity forces moisture, collecting on the pipes, downward toward the lowest point. In the areas where supports are present, the moisture also collects on the surfaces of the supports and where the supports contact the bottom of the pipe. These contact areas can be particularly problematic. As described herein, the term "contact" refers to two or more things physically touching each other.

The United States federal government mandates that certain industrial piping be maintained and periodically inspected to determine if the pipes are in satisfactory condition and, if they are corroded, whether those corroded areas need to be addressed, for example, by cleaning, rust removal and treatment, or in severe cases, replacement of a section of the pipe. It is also in the interest of the owner and maintainer of the pipe that the pipe be checked and cleaned or have the corrosion removed and the area treated often so that replacement of a section of pipe does not become necessary, as that results in substantial cost for materials, time for workers, and downtime for the movement of materials through the pipe.

However, although most of the pipe can be inspected and relatively easily maintained, the areas contacting the supports cannot be, as the supports cannot be removed without some difficulty. For example, in a traditional repair process, a temporary support will need to be constructed to hold the weight of the pipe before the old support can be removed. Oftentimes, there is no structure to hold the temporary support, so a temporary structure must be fabricated. Fabricating and building and then dismantling these structures takes substantial time and effort to accomplish. Alternatively, the pipe can be lifted by a crane, but this is also costly in terms of the time needed for labor and equipment to perform this work.

These inspections, maintenance, and repairs should occur periodically during the life of the placement of the pipe. And, as such, the placement of temporary pipe supports and support structures must be done periodically, which is a substantial waste of time and effort for the owner and maintainer of the pipe.

In some approaches, pipe supports may be lowered leaving the pipes to hang unsupported for inspection and maintenance purposes. However, such approaches may not include alternative support for the pipes at all times when the pipe supports are removed. Such inadequately supported pipes may be subject to undue structural stress and potentially become damaged. Replacing and/or repairing such damaged pipes can be time consuming and expensive.

BRIEF DESCRIPTION OF THE DRAWINGS

FIG. 2 illustrates a side perspective view of a support structure of the pipe support apparatus in accordance with one or more embodiments of the present disclosure.

FIG. 3A illustrates a side perspective view of a pipe support apparatus in accordance with one or more embodiments of the present disclosure.

FIG. 3B illustrates an end perspective view of a pipe support apparatus in accordance with one or more embodiments of the present disclosure FIG. 4A illustrates a side perspective view of a pipe support apparatus in accordance with one or more embodiments of the present disclosure.

FIG. 4B illustrates an end perspective view of a pipe support apparatus in accordance with one or more embodiments of the present disclosure.

DETAILED DESCRIPTION

Figure 1:
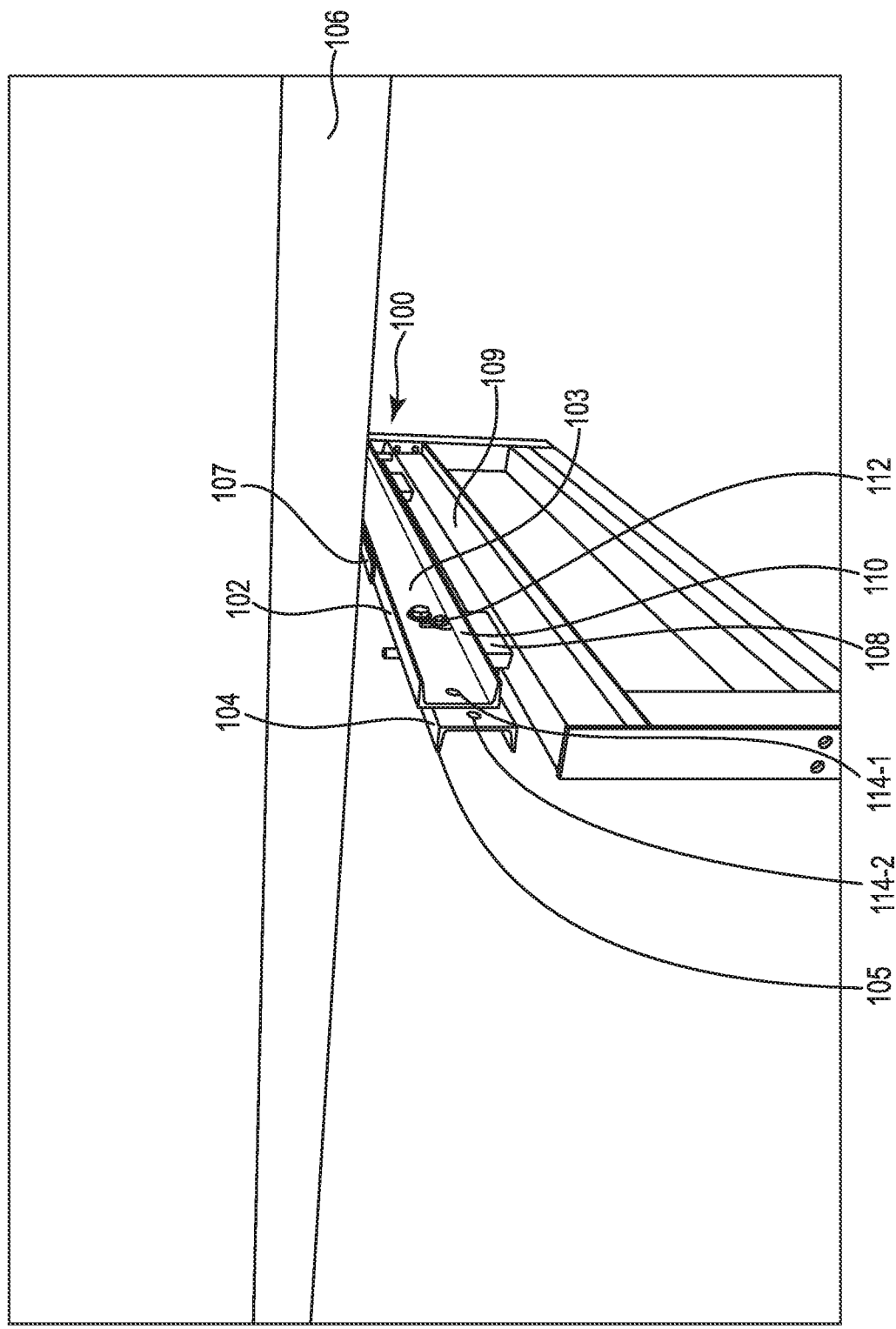
FIG. 1 illustrates an orthogonal projection of a pipe with a pipe support apparatus supporting the pipe in accordance with one or more embodiments of the present disclosure.

Pipe supports are described herein. One pipe support embodiment can include a first elongated body having a first top surface for supporting a pipe or pipes having a pipe surface, a second elongated body having a second top surface for supporting the pipe or pipes and a support structure slidably coupled to the first elongated body and to the second elongated body such that the first top surface or the second top surface is in contact with the pipe(s) surface when the other of the first surface or the second surface is not in contact with the pipe(s) surface.

As discussed above, pipe supports can be used to support a length of pipe, but the areas in contact with the pipe supports can be more susceptible to corrosion and can be difficult to inspect, maintain, and/or repair. The embodiments of the present disclosure provide pipe supports that can include parallel elongated bodies that can be alternately positioned as a pipe support structure.

The elongated bodies can be of any suitable material and shape as long as the surface contacting the pipe is sufficient to support the pipe. One suitable shape for the elongated bodies is a channel beam. Channel beams can be particularly suitable, as the shape of the channel beams provide a wider contact surface that comes in contact with the pipe surface than the end surface of a sheet of sheet metal, for example. One advantage of a channel beam is that the top of the channel beam has a surface that is perpendicular to the main body of the beam and that provides a wider contact surface for supporting the pipe(s).

Additionally, the top surface of the channel beam provides a surface upon which an interface material can be placed, in some implementations. The interface material can be a non-corrosive and/or non-conductive material that can be used, in some embodiments, to keep the pipe support and the pipe spaced apart. This interface material along with the spacing can be beneficial in reducing corrosion of the pipe.

In some embodiments, one of the elongated bodies can be secured in place in an upward position as the second elongated body sits in a downward position. When it is desired to change the pipe contact point(s), the second elongated body can, for example, be lifted to the upward position through use of a lever arm (e.g., a pry bar, etc.) that is placed such that it extends through pry bar apertures located at the end of each elongated body. Once elevated to the upward position, the second elongated body is secured in place. The secured first elongated body is then unsecured, and the first elongated body is positioned in the downward position.

The securing of the first elongated and second elongated body can be accomplished in any suitable manner. For example, bolts can be utilized to fix the first and second elongated bodies in position.

This arrangement provides several benefits. For example, one benefit is that the area of the pipe that is in contact with the pipe support can be changed from time to time. This allows for the area of contact between the pipe and the pipe support to be changed, thereby reducing the risk of corrosion at a particular location and potentially degrading the condition of one part of the pipe to the point where a section of pipe will need to be replaced.

Another benefit is that the support can be moved to allow for inspection and maintenance of the pipe(s). As used herein, maintenance refers to routine removal of coating material, such as paint or other materials applied to the surface of the pipe(s). By maintaining such materials, it may be possible to keep the surface of the pipe from becoming corroded, potentially for a prolonged period.

A further benefit is that the pipes are always supported by one or the other elongated body while being inspected and/or being repaired. As used herein, repair refers to removal of corrosion that has occurred. This may include sanding the corroded surface of the pipe, cleaning the sanded surface, applying a corrosion inhibitor, and/or painting a coating over the repaired area, among other repair processes.

In the following detailed description, reference is made to the accompanying drawings that form a part hereof. The drawings show by way of illustration how one or more embodiments of the disclosure may be practiced.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a" or "a number of" something can refer to one or more such things. For example, "a number of bolts" can refer to one or more bolts.

FIG. 1 illustrates an orthogonal projection of a pipe support apparatus supporting a pipe in accordance with one or more embodiments of the present disclosure. In the illustrated example, one pipe support apparatus 100 is shown, however, in some embodiments, multiple pipe support apparatuses could be utilized along a length of pipe.

FIG. 1 illustrates a pipe 106 placed on top of pipe support apparatus 100. As used herein, pipe support apparatus 100 can be a fixed mechanism that allows for multiple elongated bodies of a pipe support apparatus to change levels of their of the pipe contact surface(s) with the pipe 106. A level change can be accomplished by adjusting the level (e.g., height or distance from the surface of the pipe) of one of the elongated bodies with respect to the other elongated body, as further described herein.

Pipe support apparatus 100 can include a first elongated body 103, a second elongated body 105, and a support structure 108. The first elongated body 103 and the second elongated body 105 are slidably coupled to the support structure 108.

The first elongated body 103 includes a first top surface 102 (positioned at the top of the elongated body that can be the surface in contact with a pipe portion) and a bottom (positioned opposite from the first top surface on the elongated body). Similarly, the second elongated body 105 includes a second top surface 104 (positioned at the top of the elongated body that can be the surface in contact with a pipe portion) and a bottom (positioned at the bottom of the elongated body). Accordingly, the positions of the top surfaces 102 and 104 can be adjusted such that they come into contact with portions of the pipe 106, according to the current disclosure.

Further, in some embodiments, each of the elongated bodies can include a plurality of apertures to receive bolts that can be used to fix (via one or more bolts) the elongated bodies 103 and 105 to the support structure 108. For simplicity, not all components on each pipe support in each figure are given numbers, but it should be understood by the reader that each number representing a component on one pipe support in FIG. 1 can also be used to describe the same component on another one of the pipe supports shown in the other figures.

As discussed above, the first elongated body 103 and the second elongated body 105 may be other shaped structures, that can be slidably coupled and fixed in place to a support structure 108 and can provide support for the pipe. The first elongated body 103 can include a pry bar aperture 114-1 that can be positioned on the first elongated body 103.

Figure 5:
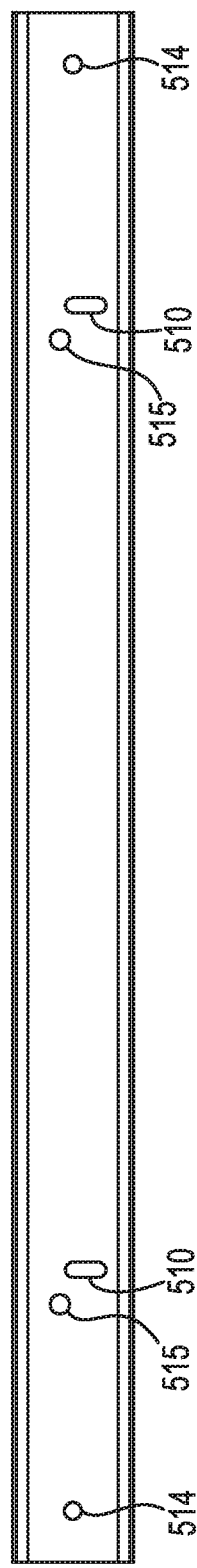
FIG. 5 illustrates a side perspective view of an elongated body of a pipe support structure in accordance with one or more embodiments of the present disclosure.

In some embodiments, pry bar apertures can be on both ends of the first elongated body (as shown in FIG. 5). Pry bar aperture 114-1 can be facing a pry bar aperture 114-2 of the second elongated body 105. When it is desired to change the pipe contact point, the elongated body in a lower position, in respect to the other elongated body (e.g., first elongated body 103) can be lifted to the upper position by utilizing a lever arm (e.g., pry bar) such that it extends through pry bar apertures 114-1 and 114-2 of the slidable elongated bodies 103 and 105.

The first elongated body 103 can also include an aperture 110 and an aperture (shown in FIG. 5 as 515) having a fixing bolt 112. In some embodiments, the aperture 110 can be a slot having a shape to receive a bolt. The slot shape allows the first elongate body 103 to slide respective to the bolt, which is attached to support structure 108, via the slot-shaped aperture 110. Aperture 515 is used to affix a bolt 112 to fix the first elongated body 103 in its upward position when the first elongated body 103 is in contact with the pipe 102.

In some embodiments, the pipe support apparatus 100 may include a first elongated body 103 having a first top surface 102 for supporting a pipe 106 having a pipe surface and the second elongated body 105 having a second top surface 104 for supporting the pipe 106. The one or both of the top surfaces 102 and 104 can be coated, glued, and/or otherwise affixed with a non-corrosive and/or non-conductive material (e.g., fiber-reinforced plastic (FRP), ultra-high molecular weight polyethylene (UHMW) or other suitable material). These top surface mounted materials are intended to be non-corrosive and/or non-conductive; and to reduce damage to the pipe surface.

In some applications, the support structure 108 can be fixedly mounted on a frame 109. The frame can be any suitable shape or design and can be provided to get the support structure close to the pipe so that the pipe support apparatus can contact and support the pipe.

As discussed above, the first elongated body 103 and the second elongated body 105 are slidably coupled to the support structure 108. In some embodiments, the first elongated body 103 and the second elongated body 105 are slidably coupled to the support structure 108 such that the first top surface 102 is in contact with the pipe surface when the second top surface 104 is not in contact with the pipe surface.

Similarly, the second elongated body 105 and the first elongated body 103 may be slidably coupled to the support structure 108 such that the second top surface 104 is in contact with the pipe surface when the first top surface 102 is not in contact with the pipe surface.

An example of how this would work is as follows, the first elongated body 103 and the second elongated body 105 are slidably coupled to the support structure 108 such that the first top surface 102 of the first elongated body 103 is in contact with the pipe surface. While the first top surface 102 is contact with the surface of the pipe, the second top surface 104 does not need to be in contact with the pipe surface. When inspection is needed, the elongated bodies 103 and 105 can be alternated such that the second top surface 104 is in contact with the pipe surface and the first top surface 102 is not in contact with the pipe surface.

In such an instance, the portion of the pipe surface that was previously in contact with the second top surface 104 is exposed. This change of pipe contact point(s) by alternating levels of the first and the second elongated body may allow for inspection of the pipe for atmospheric corrosion or for the observable condition of its coating, for example.

When the first top surface is in contact with the pipe surface, the first elongated body 103 can be bolted in place in a first position (e.g. upper/upward position) and the second elongated body 105 can be moved to a second position (e.g., lower/downward). When it is desired to change the pipe contact point(s), the second elongated body 105 can be lifted to the first position (upper, upward position), for example, by utilizing a lever arm (e.g., pry bar) and the first elongated body 103 can be lowered to the downward position.

Once the second elongated body 105 is elevated to first position (upper/upward position), the second elongated body 105 is bolted and secured in place. The one or more bolts holding the first elongated body 103 in place are then removed and the first elongated body 103 can be moved to the second position (e.g., downward/lower position).

FIG. 2 illustrates a side perspective view of a support structure 208 of a pipe support apparatus in accordance with one or more embodiments of the present disclosure. Support structure 208 can include an aperture 213-1, an aperture 213-2, and an aperture 211. The elongated bodies of a pipe support structure can be slidably attached (via aperture 211) and fixedly attached (via apertures 213-1 and 213-2) to the support structure 208 via the apertures 213-1, 213-2, and 211.

The support structure can be fabricated from any suitable material. One suitable example material would be a solid steel bar and sample dimensions could be 8 inches×10 inches×1½ inches.

Although not always necessary, the aperture 211 can be located about the center line 220 of the support structure 208, as shown in FIG. 2. The aperture 211 can be unthreaded to allow a bolt to freely move in the aperture 211. This allows a single bolt and nut combination to slidably hold the elongate bodies against the support structure. This relationship is shown in more detail in FIGS. 3B and 4B, discussed below. The aperture 211 can, for example, be ⅞ inches in diameter.

Alternating the elongated body(s) and keeping the elongated body(s) bolted to the fixed support structure can allow the pipe to be supported at all times. Additionally, alternating the elongated bodies to periodically change pipe contact points may provide an unexposed portion of the pipe surface to be exposed (unexposed due to its contact with a surface of the elongated bodies). This can facilitate when coating the pipe with protective layers with adequate drying time which can help in reducing corrosion.

In some embodiments, the first elongated body is secured to the support structure 208 by extending bolts into apertures 213-1 and 213-2 when the first elongated body is in the upward position. Apertures 213-1 and 213-2 can be threaded to allow a threaded bolt to be fastened to the inside of the aperture. Similarly, the second elongated body is secured to the support structure when the second elongated body is in the upward position. This can provide support to the pipe at all times, even while the pipe is being inspected and/or repaired.

FIG. 3A illustrates a side perspective view of a pipe support apparatus in accordance with one or more embodiments of the present disclosure. FIG. 3A illustrates a first elongated body 303 in a downward position and a second elongated body 305 in an upward position. This figure is a side view of the view in FIG. 3B as viewed from the left side of that figure and so the details of these figures can be used together.

In FIG. 3A, it shows second elongated body 305 having a slot 310 and that the second elongated body is positioned upward such that bolt 316 in slot 310 is at the bottom of the slot. This orientation indicates that the second elongated body is at its most upward position. FIG. 3A also illustrates a support structure 308, corresponding to the support structure 108 and 208 described in relation to FIGS. 1 and 2 respectively, and a pry bar aperture 314, corresponding to the pry bar aperture 114-2 in FIG. 1. In this illustration, when elongated body 305 is positioned in its upward position, it can be secured, as shown, by placing a bolt 312 through an aperture in the elongated body 305 (shown in FIG. 5 as aperture 515) and into an aperture in the support structure 308 (as shown in FIG. 2 as aperture 213-1). As such, the interior of the aperture 308 can be threaded to accept the threaded exterior of the bolt such that the bolt can be secured in the aperture, thereby fixing the elongated body in its upward position.

FIG. 3B illustrates an end perspective view of a pipe support apparatus in accordance with one or more embodiments of the present disclosure. As shown in FIG. 3B, the support apparatus has a first elongated body 303 having a first top surface 302, and a second elongated body 305 having a second surface 304. As indicated above, as in FIG. 3A, the first elongated body 303 is shown in a downward position and the second elongated body 305 is shown in an upward position, in FIG. 3B.

Additionally, the pipe support apparatus in FIG. 3B illustrates aperture 311 of the support structure 308, having bolt 316 projecting therethrough, and a fastener 317 (e.g., a nut with having a threaded aperture therein). In this arrangement, the bolt 316 and nut 317 combination sandwich the support structure 308 between elongated bodies 303 and 305 by having the bolt shaft pass through apertures in the elongated bodies (positioned on either side of the support structure 308, as shown) and the aperture 311 of the support structure 308 (e.g., apertures 510 in the elongated bodies of FIG. 5 and aperture 311).

As shown in FIGS. 3A and 4A, the apertures 310 in the elongated bodies 303 and 305 can be slot shaped and their interaction with bolt 316 and nut 317 allow the elongated bodies 303 and 305 to slide up and down with respect to the support structure 308 that is fixed to the frame 309. In such embodiments, apertures in the elongated bodies (e.g., 510) and aperture 311 are not threaded to allow the bolt to move within the apertures.

FIG. 3B illustrates the second elongated body 305 in an upward position. In this configuration, in order for the elongated body to support the pipe it must be fixed in place. This is accomplished, in the embodiment shown in FIG. 3B, by securing a bolt 312 in aperture 313. For example, aperture 313 can have a threaded interior surface that interacts with the threaded exterior surface of the bolt to secure the bolt 312 in aperture 313.

When the contact point of the pipe 306 is desired to be changed from a first position to a second position, the first elongated body 303 can be lifted from a downward position to an upward position, for example, as shown in FIGS. 4A and 4B. Once the first elongated body 303 is elevated to an upward position, the first elongated body can be secured by extending a bolt 312 into aperture 313. Once the first elongated body 303 is fixed in the upper position, the second elongated body 305 can be moved to a lower position. This is accomplished by removing bolt 312 from the aperture on the elongated body (e.g., 515 as shown in FIG. 5) and aperture 313 in the support structure 308.

As discussed with respect to FIG. 1, the first top surfaces 302 and 304 of the elongated bodies 303 and 305 can include materials 307 thereon that act as a buffer between the top surfaces of the elongated bodies and the pipe surface. As discussed, such added materials can reduce corrosion due to direct contact between the elongated bodies and the pipe surface.

FIG. 4A illustrates a side perspective view of a pipe support apparatus (analogous to the pipe support apparatus as described in FIG. 3A) in accordance with one or more embodiments of the present disclosure. Similar to the illustration of FIGS. 3A and 3B, the pipe support apparatus includes a first elongated body 403, a second elongated body 405, support structure 408, a bolt 412, and a pry bar aperture 414. However, contrary to FIG. 3A, FIG. 4A illustrates the second elongated body 405 in a downward position and not secured by a bolt via an aperture 415. In this position, a pipe is in contact with the first top surface (e.g. material 407 on surface 402 as described in FIG. 4B) of the first elongated body 403.

FIG. 4B illustrates an end perspective view of a pipe support apparatus in accordance with one or more embodiments of the present disclosure. In this Figure, the pipe support apparatus includes a first elongated body 403, a second elongated body 405 and a support structure 408.

The first elongated body 403 has a first top surface 402 and the second elongated body 405 has a first top surface 404, with each top surface including a buffer material 407 thereon. The elongated bodies 403 and 405 are slidably held to the support structure 408 by bolt 416 and nut 417 where the bolt 416 passes through apertures 410 in the elongated bodies and aperture 411 in the support structure 408. Further, the first elongated body 403 is secured in a fixed upward position via bolt 412 positioned in aperture 413 in the support structure 408 to support the pipe.

Contrary to FIG. 3B, FIG. 4B illustrates the first elongated body 403 in an upward position and, although not shown in FIG. 4A, in FIG. 4B the first elongated body 403 is shown secured by a bolt 412, while the second elongated body 405 is in a downward position and is not secured by a bolt in aperture 415.

When the contact point of the pipe is desired to be changed from a second position to a first position, for example, as is shown in the change between FIGS. 3A and 3B and 4A and 4B, the first elongated body 403 can be raised from a lower position to an upward position as shown in FIGS. 4A and 4B. Once the first elongated body 403 is elevated to an upward position, the first elongated body 403 can be secured by extending a bolt 412 into aperture 413. In some embodiments, the second elongated body 405 can be lowered to a downward position once the first elongated body 403 is positioned in an upward location where it is supporting the pipe and has been secured to the support structure 408.

FIG. 5 illustrates a side perspective view of an elongated body of a pipe support apparatus in accordance with one or more embodiments of the present disclosure. As discussed herein, other shaped elongated bodies can be used for one or both elongated bodies, so long as the shapes can support the weight of the pipe and are adjustable as described herein. The elongated body illustrated in FIG. 5 can be analogous to the first and/or second elongated body illustrated in relation to FIGS. 1 and 3A-4B.

As can be seen, in FIG. 1, by how little contact area on the elongated body is used to support a pipe, in some applications, multiple pipes may be supported by one elongated body, such as the one shown in FIG. 5. In this manner pipes having bottom surfaces that are at substantially the same height may be supported by an elongated body at the same time. The heights may differ slightly so long as when the elongated body engages to support all of the pipes, it does not deform or break a pipe.

The elongated body includes apertures 510 and 515 to receive bolts and secure the elongated body to a support structure (e.g., 108/208/308/408 etc.). As discussed herein, the elongated body can be slidably coupled to a support structure via the slotted apertures 510 and can be fixedly secured in place via the apertures 515. Additionally, the elongated body can include pry bar apertures 514, with which the position of the elongated body can be adjusted through use of a lever arm, as described above.

Through use of embodiments of the present disclosure, pipes can continuously be supported during inspection, maintenance, and repair of the pipe bottom surfaces. Additionally, such an elongated design can allow for support of multiple pipes with a single pipe support apparatus, among many other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

These embodiments are described in sufficient detail to enable those of ordinary skill in the art to practice one or more embodiments of this disclosure. It is to be understood that other embodiments may be utilized, and that process and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A pipe support apparatus, comprising:
a first elongated body having a first top surface for supporting a pipe having a pipe surface;
a second elongated body having a second top surface for supporting the pipe surface; and
a support structure having two side surfaces and wherein the first elongated body and second elongated body each have a side surface and wherein the side surfaces of the first and second elongated bodies each abut a different one of the two side surfaces of the support structure and are vertically slidably coupled independently of each other to the support structure such that the first elongated body and the second elongated body sandwich the support structure between the first and second elongated bodies and wherein the first and second elongated bodies each slide along a different side surface of the support structure to move independently with respect to each other and such that one of either the first top surface or the second top surface is in contact with the pipe surface when the other one of the first top surface and the second top surface is not in contact with the pipe surface and such that the contact with the pipe surface can be alternated between the first and second top surfaces.

2. The pipe support apparatus of claim 1, wherein a bolt extends through the first elongated body and the second elongated body to slide the first elongated body from a first position to a second position.

3. The pipe support apparatus of claim 1, wherein the first elongated body and the second elongated body are parallel with respect to each other.

4. The pipe support apparatus of claim 1, wherein the support structure includes a plurality of apertures to receive a bolt.

5. The pipe support apparatus of claim 1, wherein the support structure is fixedly mounted to a support frame.

6. A pipe support apparatus, comprising:
a first elongated body having a first top surface for supporting a pipe having a pipe surface;
a second elongated body having a second top surface for supporting the pipe surface;
a support structure having two side surfaces and wherein the first elongated body and second elongated body each have a side surface and wherein the side surfaces of the first and second elongated bodies each abut a different one of the two side surfaces of the support structure and are vertically slidably coupled thereto independently of each other to the support structure such that the first elongated body and the second elongated body sandwich the support structure between the first and second elongated bodies and wherein the first and second elongated bodies each slide along a different side surface of the support structure to move independently with respect to each other and such that one of either the first top surface or the second top surface is in contact with the pipe surface when the other one of the first top surface and the second top surface is not in contact with the pipe surface and such that the contact with the pipe surface can be alternated between the first and second top surfaces and wherein the first elongated body moves from a first position to a second position responsive to being adjusted via a plurality of apertures wherein first and the second top surfaces expose a portion of the pipe surface.

7. The pipe support apparatus of claim 6, wherein the first top surface of the first elongated body is adjusted to be in contact with the pipe surface to bring the second elongated body out of contact from the pipe surface.

8. The pipe support apparatus of claim 7, wherein bringing the second elongated body out of contact from the pipe surface exposes a different portion of the pipe surface.

9. The pipe support apparatus of claim 6, wherein the second top surface of the second elongated body is adjusted to be in contact with the pipe surface such that the first elongated body is out of contact from the pipe surface.

10. The pipe support apparatus of claim 6, the support structure includes a plurality of apertures to receive bolts.

11. The pipe support apparatus of claim 10, wherein the bolts couple the support structure, the first elongated body and the second elongated body.

12. The pipe support apparatus of claim 6, wherein the first elongated body and the second elongated body are adjusted alternately.

13. A pipe support apparatus, comprising:
a first elongated body having a top surface for supporting a pipe having a pipe surface and a pry bar aperture;
a second elongated body having a top surface for supporting the pipe surface and a pry bar aperture; and
a support structure having two side surfaces and wherein the first elongated body and the second elongated body each have a side surface and wherein the side surfaces of the first and second elongated bodies each abut a different one of the two side surfaces of the support structure and are vertically slidably coupled thereto and sandwich the support structure between the first and second elongated bodies and wherein the first and second elongated bodies each slide along a different side surface of the support structure such that the contact with the pipe surface can be alternated between the first and second top surfaces; and the first elongated body is adjusted from an upward position to downward second position via the pry bar apertures, to bring a portion of the pipe surface out of contact from the top surface of the first elongated body.

14. The pipe support apparatus of claim 13, wherein the second elongated body is adjusted from a downward position to an upward second position, via the pry bar apertures, to bring a different portion of the pipe surface in contact with the second elongated body.

15. The pipe support apparatus of claim 13, wherein the first elongated body and the second elongated body are adjusted to the upward and the downward position via a lever arm.

16. The pipe support apparatus of claim 13, wherein the first elongated body and the second elongated body are secured to the support structure via a plurality of bolts received by a plurality of bolt receiving apertures.

17. The pipe support apparatus of claim 16, wherein at least one aperture of the plurality of bolt receiving apertures is a slot shape.

18. The pipe support apparatus of claim 16, wherein the first elongated body is secured to the support structure via the plurality of bolts when the first elongated body is in the upward position and the second elongated body is secured to the support structure when the second elongated body is in the upward position.

\* \* \* \* \*